United States Patent [19]

Sumi et al.

[11] Patent Number: 4,459,001
[45] Date of Patent: Jul. 10, 1984

[54] AUTOMATIC FOCUSING SYSTEM WITH INTERRUPT FUNCTION

[75] Inventors: Akiyasu Sumi, Yokohama; Tohru Kawai, Kawasaki, both of Japan

[73] Assignee: Canon Kabushiki Kaisha, Tokyo, Japan

[21] Appl. No.: 345,651

[22] Filed: Feb. 4, 1982

[30] Foreign Application Priority Data

Feb. 23, 1981 [JP] Japan .............................. 56-24187[U]

[51] Int. Cl.³ .............................................. G03B 3/10
[52] U.S. Cl. .................................... 354/400; 354/455; 354/286
[58] Field of Search ............... 354/195, 196, 197, 198, 354/199, 25 R, 25 N, 286

[56] References Cited

U.S. PATENT DOCUMENTS

| | | |
|---|---|---|
| 3,798,660 | 3/1974 | Hasegawa et al. |
| 4,230,403 | 10/1980 | Hashimoto et al. ................ 354/286 |
| 4,247,190 | 1/1981 | Hashimoto et al. ................ 354/286 |
| 4,323,303 | 4/1982 | Enomoto ............................ 354/195 |
| 4,329,033 | 5/1982 | Masunaga et al. .................... 354/25 |
| 4,359,276 | 11/1982 | Tomori ............................... 354/195 |

Primary Examiner—Russell E. Adams
Attorney, Agent, or Firm—Fitzpatrick, Cella, Harper & Scinto

[57] ABSTRACT

The invention provides a photographing apparatus having a focusing system for controlling the movement of a focusing lens. The output of the signal from the focusing system is so controlled that the continuous operation of the focusing system is interrupted in response to the operation of an imaging device such as a single reflex camera, a video camera, etc.

3 Claims, 8 Drawing Figures

AUTOMATIC FOCUSING SYSTEM WITH INTERRUPT FUNCTION

BACKGROUND OF THE INVENTION

1. Field of the Invention

The present invention relates to a photographing apparatus having an automatic focusing system for generating a distance signal corresponding to the distance between the apparatus and an object to be photographed.

2. Description of the Prior Art

There have been proposed various types of automatic focusing systems for measuring the distance between a photographing apparatus and an object to be photographed and generating a distance signal which is to be used as a drive signal for driving a photographing lens, such as, e.g., described in U.S. Patent Application Ser. No. 121,690 as filed Feb. 15, 1980 (corresponding to Japanese Patent Application Laid-open No. 115,023/1980 laid open on Sept. 4, 1980).

The known automatic focusing systems may be roughly classified into a passive type and an active type. An automatic focusing system of the passive type receives light reflected from an object, processes a signal corresponding to the received light to obtain a distance to the object and then moves the photographing lens to an in-focus position. Another automatic focusing system of the same type moves the photographing lens in response to the shutter release operation while receiving the light transmitted through the photographing lens so that, on the basis of the processing of the changes in the light transmitted every moment through the lens, the movement of the photographing lens is stopped. An automatic focusing system of the active type emits light for the measurement of the distance from the photographing apparatus to the object, receives the light reflected by the object, and generates an automatic focusing signal. In automatic focusing systems of either type, an optical signal corresponding to the object distance is converted into an electric signal, and this electric signal is then processed whereby the photographing lens is moved accordingly to the in-focus position. For operating the automatic focusing system, there are known two focusing modes. According to one focusing mode, the operation for measuring the distance to an object is performed only once, after the power is turned on. According to the other focusing mode, focusing signals are generated in response to the changes in the object distance due to the movement of the object. In the automatic focusing system having the latter focusing mode, that is, the focusing mode wherein the focusing signals are generated in response to the changes in the object distance (to be referred to as "continuous focusing mode" hereinafter), distance signals may be generated and the photographing lens may be moved accordingly upon the movement of the object, even during the period from the start of the exposure control operation (for example, depression of the shutter releast button) . . . opening of the shutter in response to the operation of the exposure control mechanism . . . closing of the shutter . . . until the completion of the exposure of the photosensitive material. For this reason, it is not clear to an operator whether the photographing operation is effected under the in-focus state at the time immediately before the shutter release operation or under the conditions just upon completion of the shutter release operation, i.e., after the object has been moved. It is therefore not clear to the operator whether the subject has been photographed in a composition as intended.

SUMMARY OF THE INVENTION

In view of the foregoing, it is an object of the present invention to provide a photographing apparatus including means for interrupting the operation of an automatic focusing system in the continuous focusing mode in response to the operation of an exposure control mechanism after starting the exposure control operation of a camera to prohibit generation of a distance signal to maintain a photographing lens inoperative.

Other objects and features of the invention will be apparent from the following description taken in conjunction with the accompanying drawings.

BRIEF DESCRIPTION OF THE DRAWINGS

The drawings show an embodiment of an interchangeable lens having therein an automatic focusing system, according to the present invention, and in which.

DESCRIPTION OF THE PREFERRED EMBODIMENTS

Figure 1:
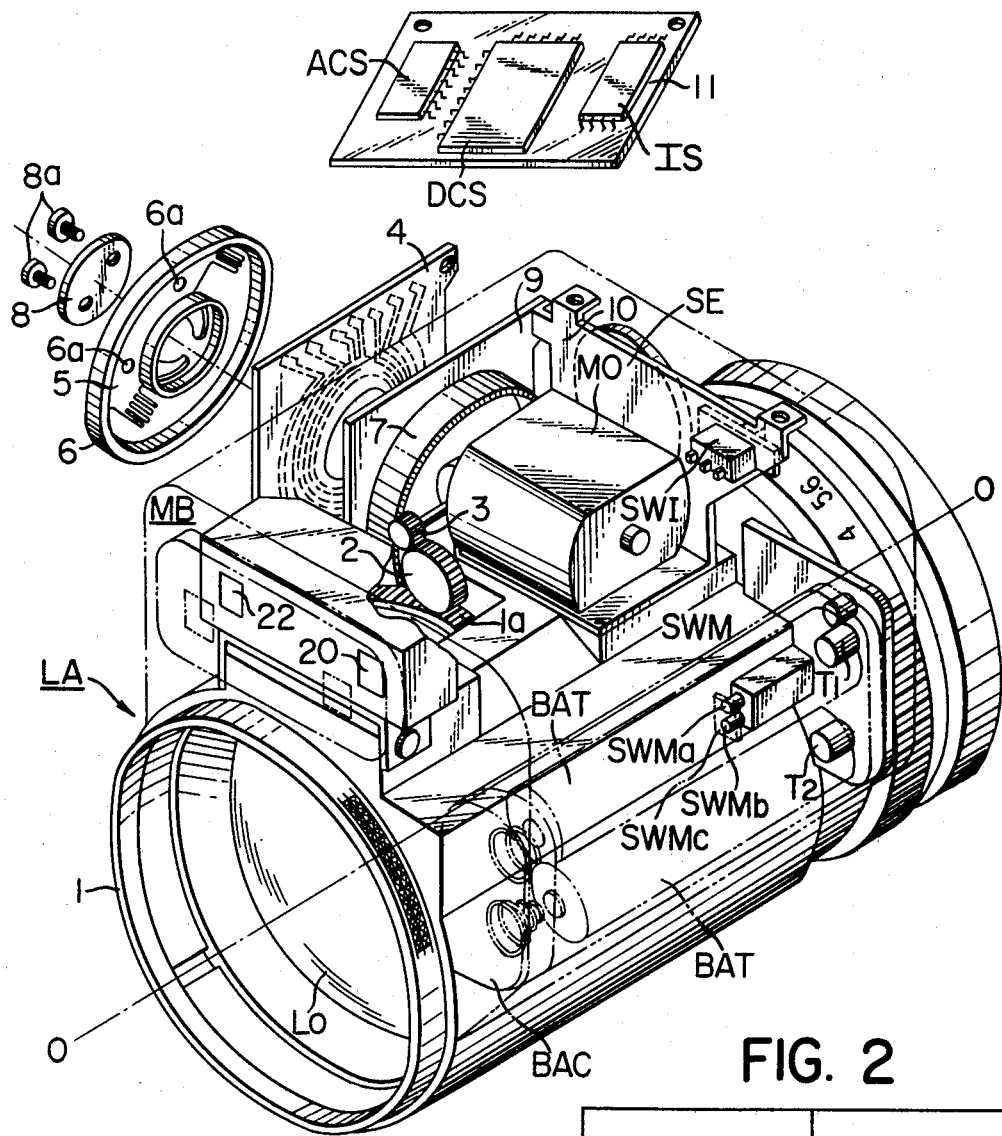
FIG. 1 is a perspective view showing the arrangement of the units constituting the automatic focusing system provided on the lens barrel.

In FIG. 1, there is shown an interchangeable lens into which an automatic focusing system is incorporated so that the movement of a photographing lens is stopped in response to a distance signal generated by the automatic focusing system. A line sensor IS is of known type in the field of automatic focusing. Integrated circuits DCS and ACS constitute a distance measuring circuit. The integrated circuits DCS and ACS receive the signal from the line sensor IS and produce the object distance information in the form of electric signals, and a drive signal for driving a motor MO and other signals required for the automatic focusing control are generated therefrom. The details of the line sensor IS and the integrated circuits DCS and ACS are described in U.S. Patent Application Ser. No. 287,698, now U.S. Pat. No. 4,402,586, and will not be described herein.

Figure 2:
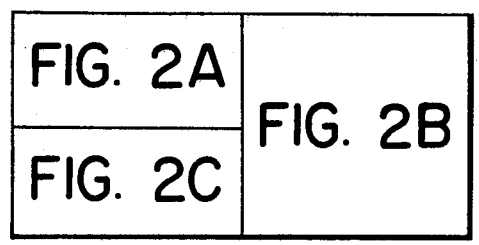
FIG. 2 shows how the circuits of FIGS. 2A, 2B and 2C are arranged.
Figure 2A:
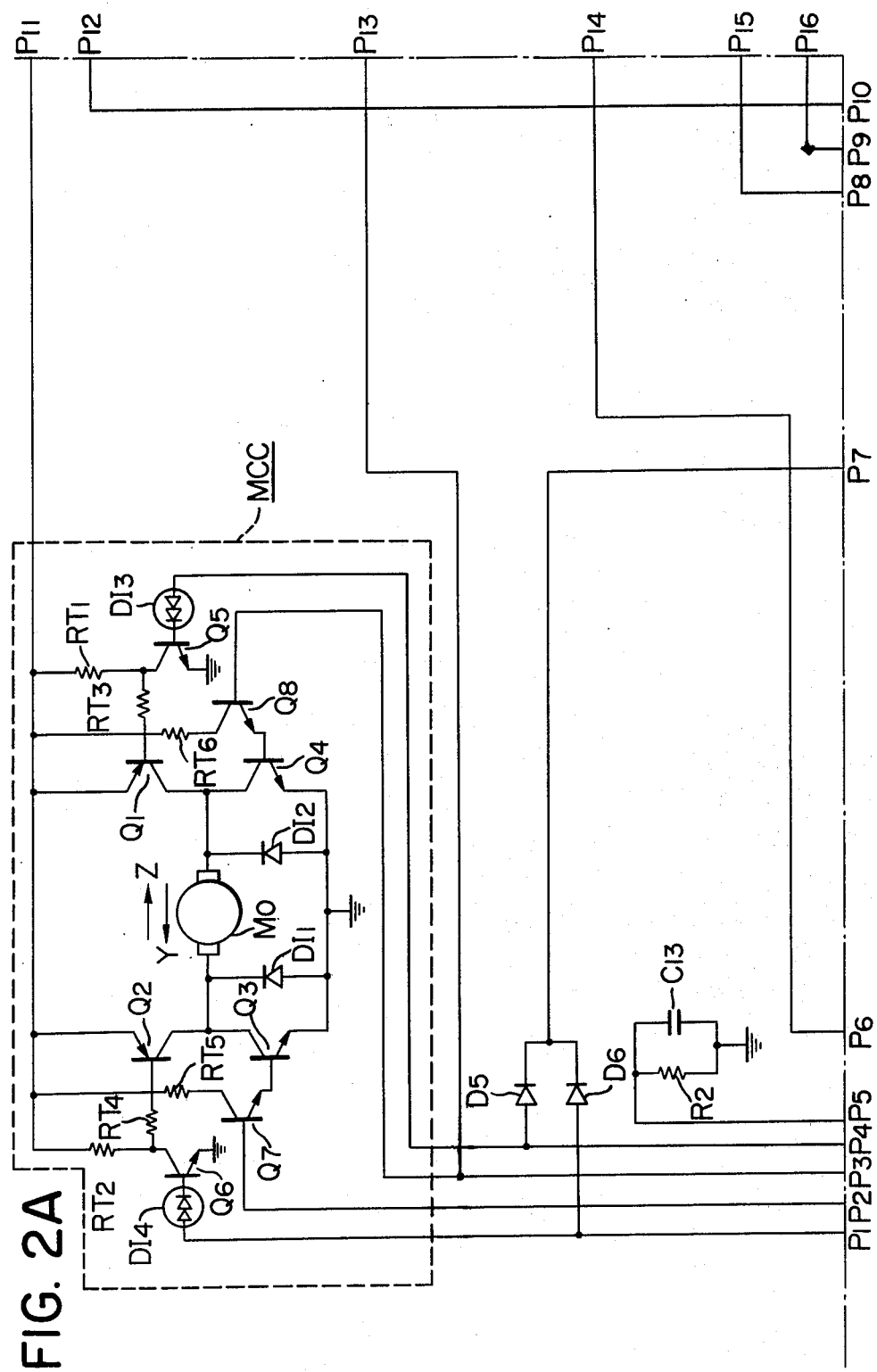
FIGS. 2A, 2B and 2C are block diagrams of the automatic focusing system in FIG. 1.
Figure 2B:
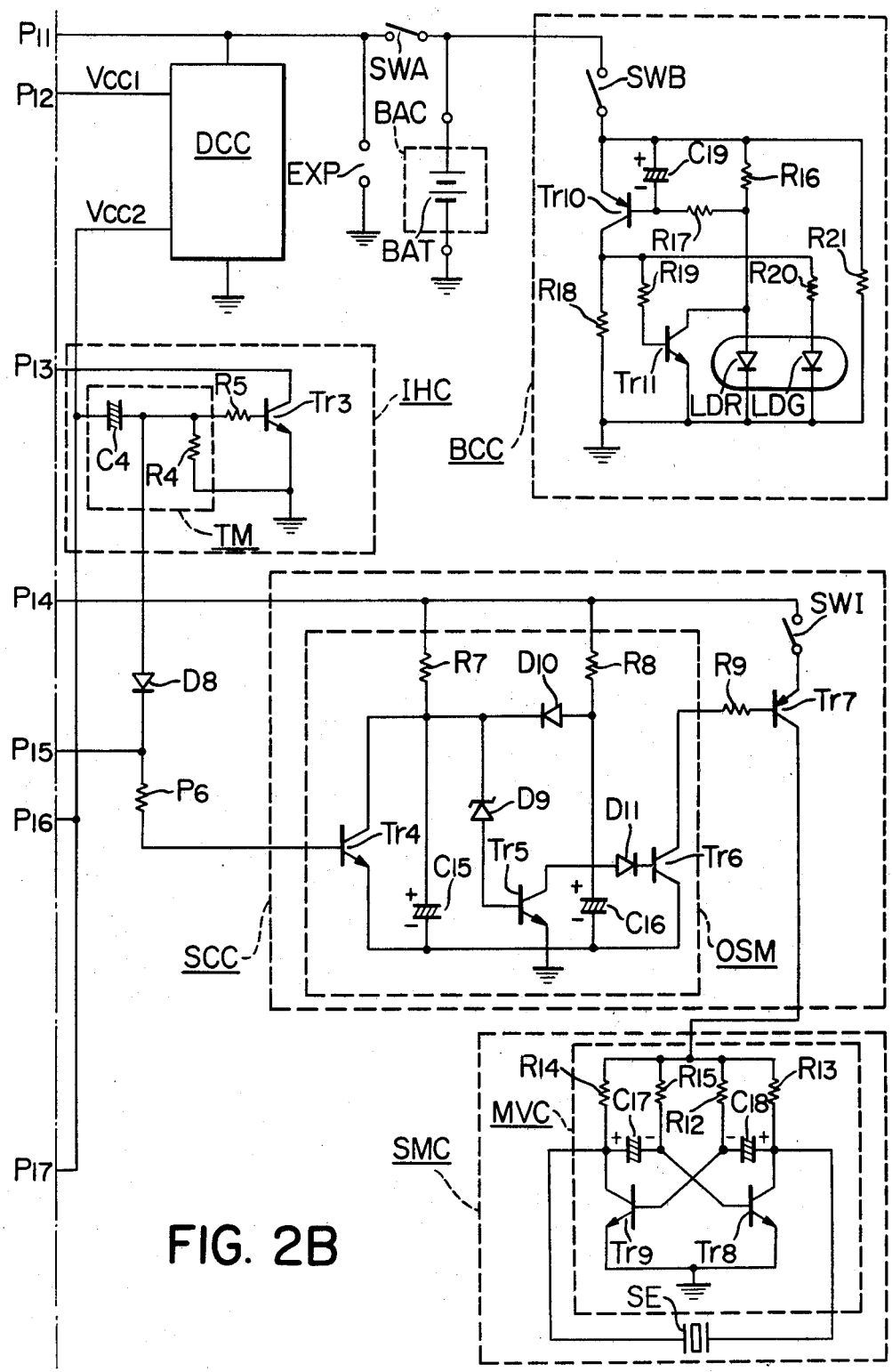
Figure 2C:
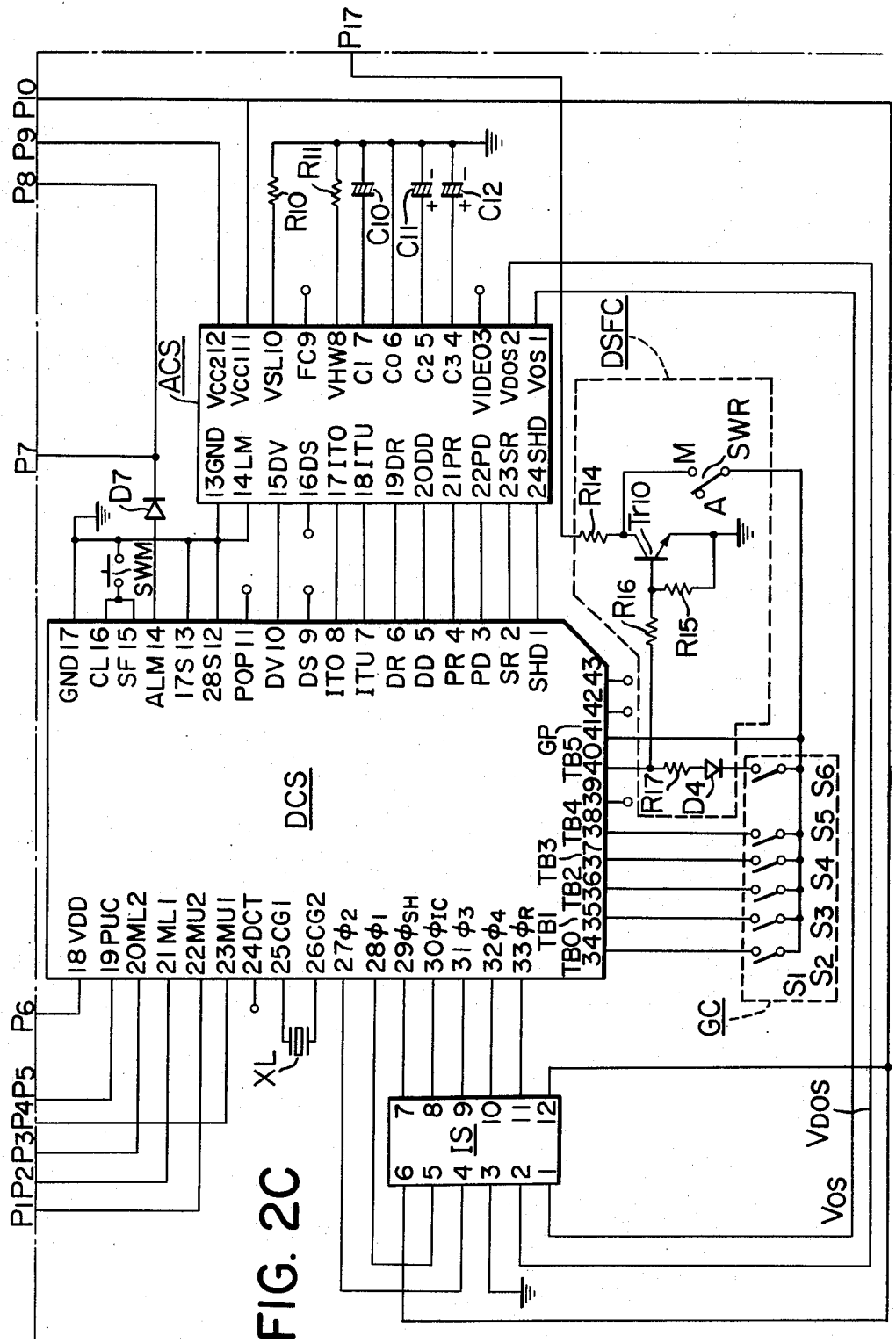

FIGS. 2A, 2B and 2C are block diagrams of the distance signal generator of the automatic focusing system. The distance signal generator includes a motor drive control circuit MCC, a drive signal forming circuit DSFC, a power source voltage checking circuit BCC, a sound producing circuit SMC, a sound control circuit SCC, and a sound prohibiting circuit SPC.

In FIG. 2, the focusing mode can be selected by operating a switch SWM. When the switch SWM is closed, the distance to an object is measured upon depression of a power source switch SW1. A photographing lens (not shown) in the interchangeable lens shown in FIG. 1 is driven to the focusing position by the motor MO. After signal distance measuring operation, the distance signal is no longer generated by the distance measuring circuit (integrated circuits DCS and ACS), and the distance measuring operation is terminated.

When the switch SWM is opened, the continuous focusing mode as described above is established. In this mode, the distance signals are generated continuously, so that when the object distance changes, the distance signal according to the changed distance is generated. Thus, the motor MO drives the photographing lens to constantly keep it at the in-focus position. The focusing mode which is established when the switch SWM is closed corresponds to the semiautomatic one-more-focus mode as described in U.S. Patent Application Ser. No. 287,698, now U.S. Pat. No. 4,402,586, mentioned above, while the focusing mode established when the switch SWM is opened corresponds to the fully automatic synchronous mode described therein.

Therefore when the switch SWM is opened, and if the object moves after the start of the exposure control operation, such as by the depression of the shutter release button, the corresponding distance signal is generated, which causes the problems as described above.

Figure 3:
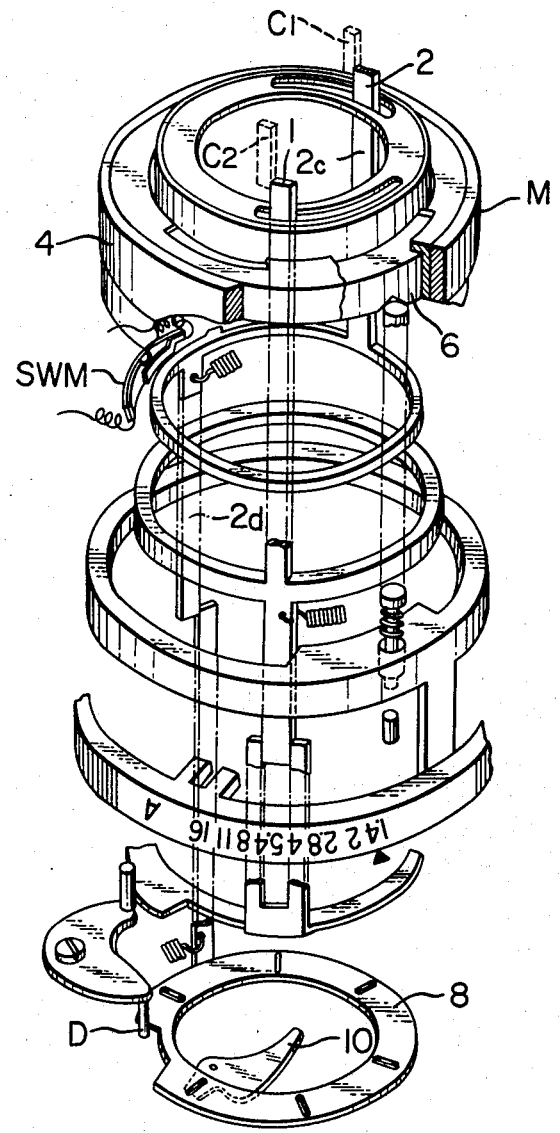
FIG. 3 is a perspective view of the main part of the interchangeable lens shown in FIG. 1.

FIG. 3 is a perspective view of the main part of an interchangeable lens according to an embodiment of the present invention. According to this embodiment, the aforeswitch SWM is operated by an actuating member for actuating a diaphragm at the side of the interchangeable lens in response to the shutter release operation of the camera. In the continuous focusing mode, the distance to an object is measured and the photographing lens is driven according to the measured object distance, and after the in-focus state is established, further movement of the photographing lens is prohibited in response to the release operation so that the photographing lens is held at the in-focus state immediately before the release operation.

FIG. 3 shows a diaphragm unit D in the interchangeable lens, a mount M for mounting the interchangeable lens on the camera, and an actuating member 2 for actuating the diaphragm unit D and a signal member 1 for transmission of exposure control signals between the interchangeable lens and the camera, all of which are not shown in FIG. 1. The configuration, mode of operation, and function of the interchangeable lens shown in FIG. 3 are similar to those described in U.S. Pat. Nos. 4,247,190 and 4,230,403 and only the features pertinent to the invention will be described herein.

In FIG. 3, the switch SWM which is also shown in FIG. 2 is mounted to a lens barrel 4 so as to be rotatable relative thereto. The switch is securely fixed to a mount member 6 which is held unrotatably with respect to the camera when the interchangeable lens is mounted to the camera (see FIGS. 4A and 4B). When the interchangeable lens is mounted to the camera, the signal member 1 performs transmission of the aperture data in cooperation with a signal transmission member C2 at the side of the camera. The actuating member 2 operates in cooperation with an associating member C1 at the side of the camera. When an exposure control mechanism (not shown) of known construction is actuated, the incorporating member C1 moves in the direction indicated by an arrow, so that the actuating member 2 at the side of the lens moves in the same direction to rotate a diaphragm actuating ring 8 of the diaphragm unit D to thereby drive diaphragm blades 10. The aperture value is thus controlled.

The switch SWM is closed when the actuating member 2 is moved in the direction indicated by the arrow.

The operation of this embodiment is as described below. When the manually operable switch SWM is closed, a distance signal is generated by a signal distance measuring operation, and the photographing lens is moved to the in-focus position.

Since the opening and closing operation of the switch SWM is controlled by the release mechanism at the side of the camera, focusing is achieved by the focusing operation prior to the release operation. When the switch SWM is opened, the distance measuring circuit (the line sensor IS and the integrated circuits DCS and ACS) generates distance signals to move, according to the movement of the object, the photographing lens to the corresponding in-focus position. When the shutter release operation is effected when the object is at a certain position, the photographing lens is moved to the corresponding in-focus position by the corresponding distance signal, and at the same time, the associating member C1 at the side of the camera moves to rotate the actuating member 2 at the side of the lens in the direction indicated by the arrow to close the switch SWM by a projection 2a. When the switch SWM is closed, the output of the distance signal is prohibited. Therefore, even if the subject moves after the release, the photographing lens will not move and therefore the aforementioned disadvantages can be eliminated.

Figure 4A:
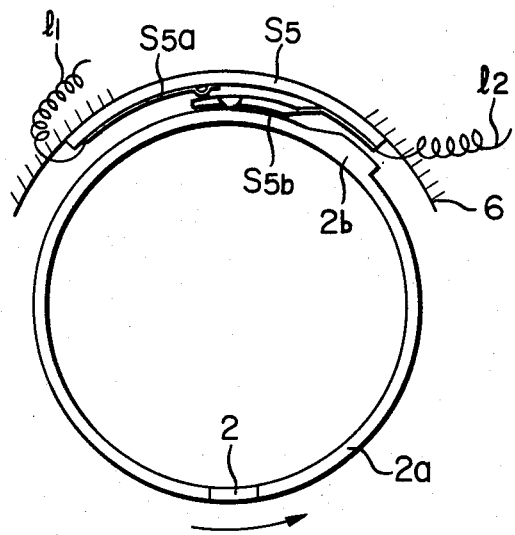
FIGS. 4A and 4B are views showing the arrangement, within the lens barrel, of the switch operated in response to the operation at the camera side.
Figure 4B:
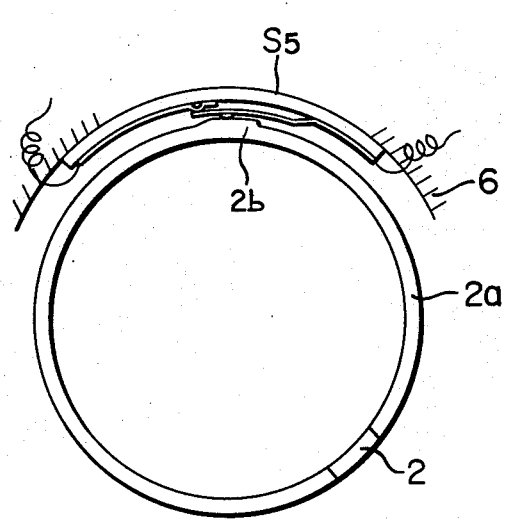

FIGS. 4A and 4B are views showing the arrangement, within the lens barrel, of the switch SWM shown in FIG. 3. The switch SWM comprises a stationary contact member S5a and a movable contact member S5b. Wires 11 and 12 are respectively connected to the contact members S5a and S5b, and form the circuitry shown in FIG. 2.

The contact members S5a and S5b are arranged on the inner circumference of the mount member 6 of the lens barrel shown in FIG. 3 so that their contacts oppose each other. A projection 2b extends from the outer circumference of the ring 2a so as to establish the contact between the contacts upon the rotational movement of the actuating member 2.

Depending upon the construction of the lens barrel, it is possible to arrange the switch SWM in the vicinity of arms 2c and 2d of the actuating member 2 so as to close the switch SWM by these arms. According to the present invention, in the focusing mode wherein the photographing lens is moved to the corresponding in-focus position according to the movement of the object, the focusing operation is interrupted in response to the shutter release operation. Therefore, the operator need not worry about the focusing state.

The present invention has been described with reference to an embodiment wherein the opening and closing operation of the switch SWM is controlled by a member which is operable in association with the diaphragm unit. However, it is to be understood that, in an interchangeable lens into which the shutter unit is incorporated, the opening and closing operation of the switch SWM may be controlled by a movable element which is operable in association with the shutter.

What we claim is:
1. An automatic focus adjusting system comprising:
 (a) an interchangeable lens assembly including a focusing lens and a diaphragm unit;
 (b) a camera including an associating member which operates said diaphragm unit in response to a release operation of the camera;
 (c) automatic focusing means for moving said focusing lens to an in-focus position;

(d) an actuating member for driving said diaphragm unit in conjunction with the operation of said associating member provided in said camera; and (e) switching means movable between open and closed positions on the basis of said actuating member, said switching means being connected with said automatic focusing means to terminate the operation of said automatic focusing means in response to a signal from said switching means.

2. An automatic focus adjusting lens system for use with a camera, said system comprising:

(a) an interchangeable lens assembly including a focusing lens and a diaphragm unit;

(b) automatic focusing means for moving said focusing lens to an in-focus position;

(c) an actuating member for driving said diaphragm unit in response to a release operation of the camera; and (d) switching means movable between open and closed positions on the basis of said actuating member, said switching means being connected with said automatic focusing means to terminate the operation of said automatic focusing means in response to a signal from said switching means.

3. An interchangeable lens barrel inter-connectable with an automatic focusing apparatus for use with a camera, said barrel comprising:

(a) a diaphragm unit;

(b) an actuating member for driving said diaphragm unit by utilizing drive force caused by a release operation of the camera; and (c) switching means movable between open and closed positions on the basis of said actuating member so that the operation of the automatic focusing apparatus is terminated in response to a signal from said switching means when the automatic focusing apparatus is connected with said switching means.

* * * * *